Sept. 29, 1959 — J. E. KRAUSS ET AL — 2,906,396
CONVEYOR BELT PROTECTOR
Filed Dec. 12, 1956 — 2 Sheets-Sheet 1

INVENTORS
John E. Krauss,
BY Delbert R. Nixon,
Mann, Brown & McWilliams
Attys

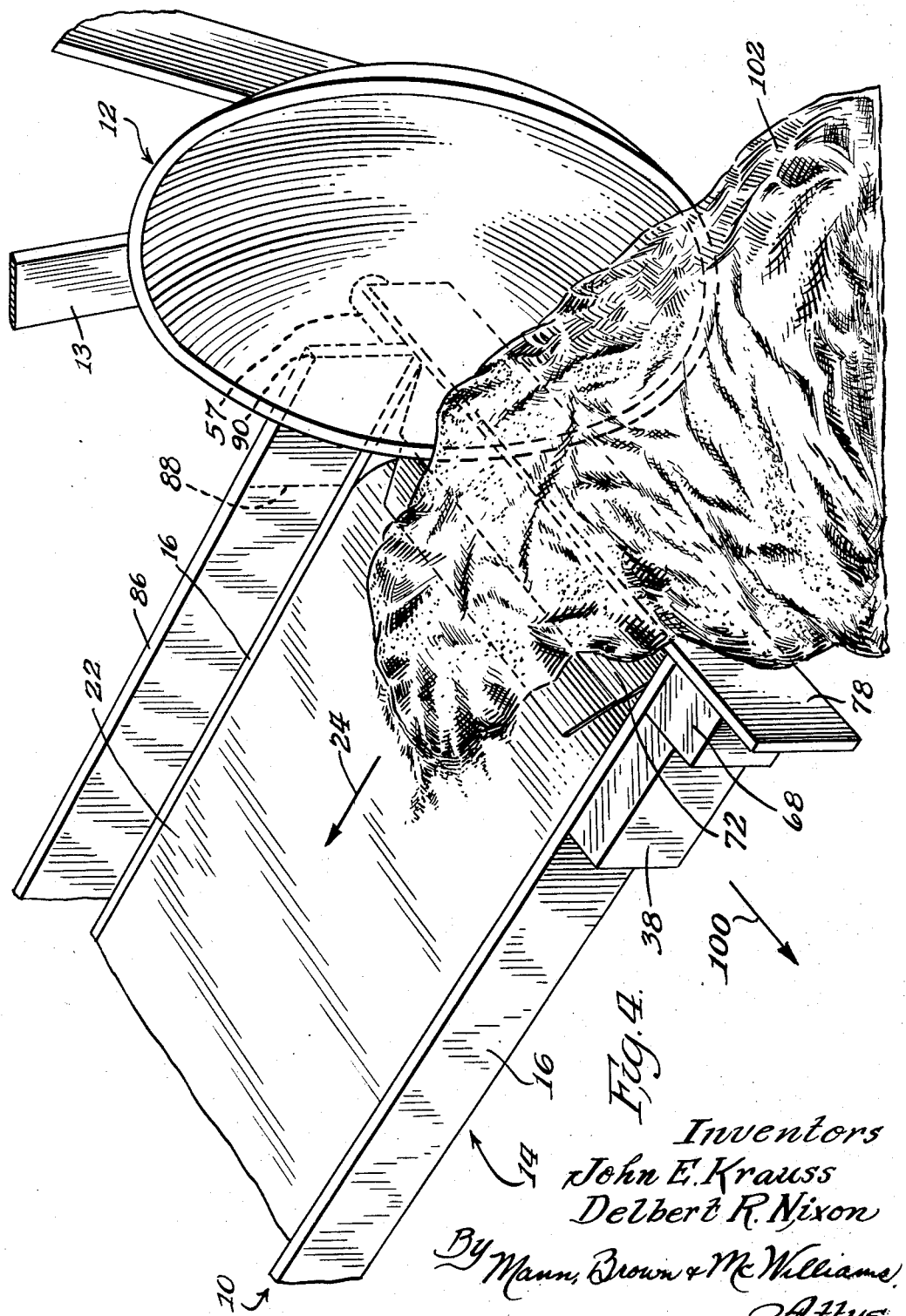

United States Patent Office 2,906,396
Patented Sept. 29, 1959

2,906,396
CONVEYOR BELT PROTECTOR

John E. Krauss, Norris, and Delbert R. Nixon, Harrison, Mont.

Application December 12, 1956, Serial No. 627,948

7 Claims. (Cl. 198—229)

Our invention relates to a conveyor belt protector, and more particularly, to belt protectors particularly adapted for use in connection with elevating conveyors of the type found on conventional elevating graders.

The problem which our invention solves becomes particularly acute in machines such as elevating graders, though our invention is of general application. Elevating graders generally include a wheeled vehicle carrying an upwardly inclined belt conveyor extending crosswise of the machine, with its lower end positioned closely adjacent the ground. These machines include a grading disc positioned as closely as possible to the lower end of the belt conveyor; and when the vehicle moves in a forward direction, the disc bites into the ground and deflects earth on to the conveyor belt, which conveys it upwardly and away from the disc.

Heretofore, this lower or material receiving end of the belt has been completely exposed and unprotected. The disc in deflecting earth upon the conveyor inherently builds up dirt and other matter such as stones, gravel, and the like between the underportion of the belt and the ground, and this, coupled with the movement of the belt about its pulley, and the movement of the conveyor as a whole in the direction of travel of the vehicle, results in an unusually harsh wearing action on the belt with consequently rapid deterioration of the belt and a materially shortened useful life thereof.

This condition is aggravated when grading gravel and the like, since the only way the belt can be loaded is by digging its material receiving end into the gravel that becomes wedged between the belt and the disc.

If the disc is moved away from the belt end to reduce the wear on the belt, the belt will not load as most of the earth being graded slips between the belt and the disc and therefore is lost.

The principal object of our invention is to provide a guard or protector for the belt which permits the disc to be positioned almost in contact with the belt and yet insures that the belt will not be scraped or gouged by the accumulation of earth, stones, gravel, and the like between it, the ground, and the disc.

Another object of the invention is to provide a conveyor belt protector of general application which is readily adapted for use on conveyors of the type that are pressed against the material being loaded, or are of the type in which the material being loaded is pressed against the loading end of the conveyor.

Still another object of the invention is to provide a supplemental conveying device associated with our guard or protector which insures that the material receiving end of the conveyor belt is kept clear from build ups of the material being graded.

A further object of the invention is to provide a conveyor belt protector that is economical of manufacture, efficient in use, and capable of application to substantially all forms of belt conveyors.

Other objects, uses, and advantages will be obvious or become apparent from a study of the following description and the drawings.

In the drawing:

Figure 4 is similar to Figure 1, but on an enlarged scale.

Figures 1, 2, 3:
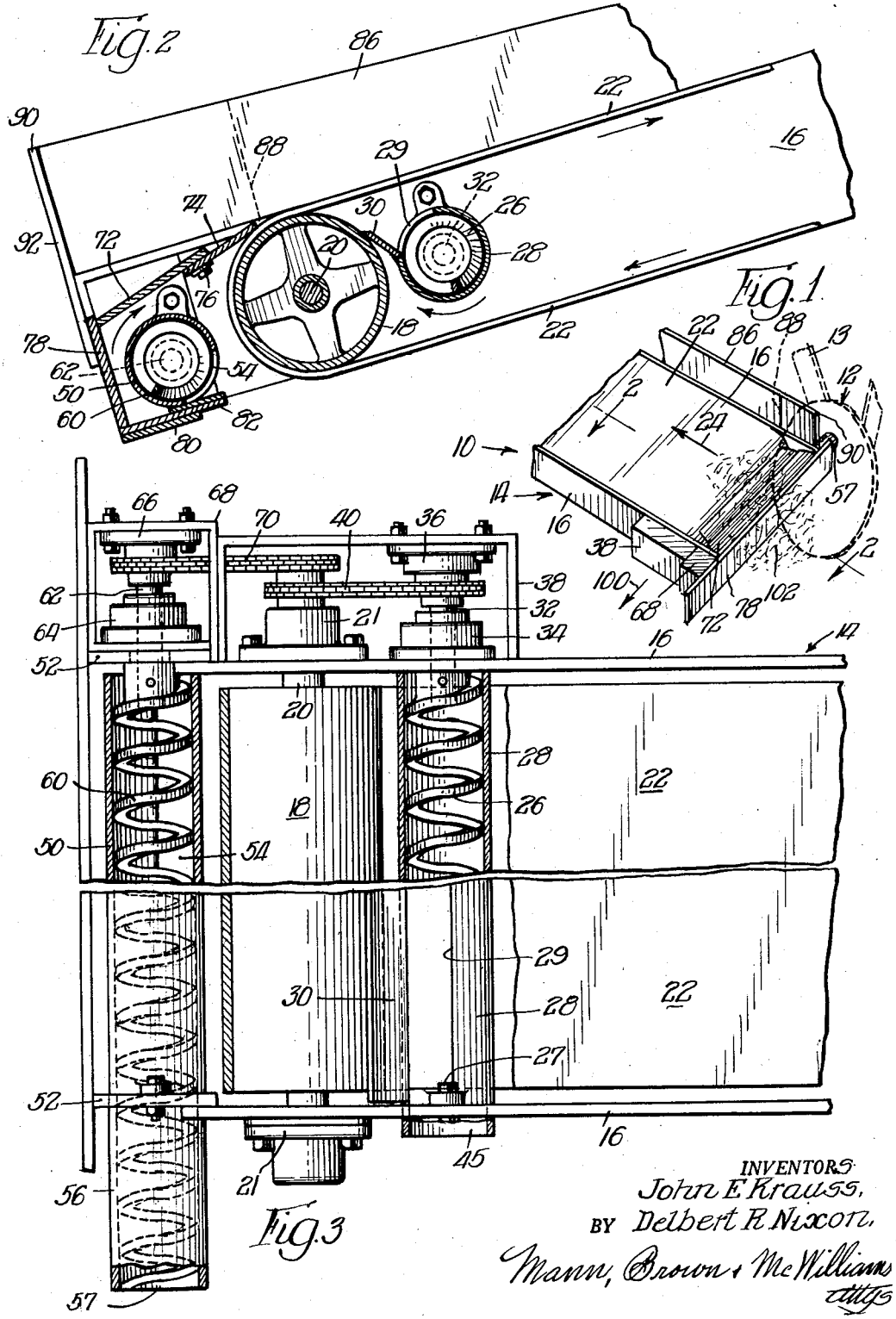
Figure 1 is a perspective view of the pertinent portions of a conventional elevating grader illustrating the cooperation between the elevating conveyor thereof and the grading disc.
Figure 2 is a cross sectional view along line 2—2 of Figure 1.
Figure 3 is a plan view on an enlarged scale of the device illustrated in Figures 1 and 2 as applied to the elevating conveyor, parts being shown in section and parts being broken away for clarity of illustration.

Reference numeral 10 of Figure 1 generally indicates an elevating conveyor as it is mounted in any suitable manner upon an elevating grader of a conventional type (the details of which are not shown), which grader also carries a conventional grading disc 12 secured thereto by suitable supports 13. The conveyor 10 generally comprises a frame 14 including side members 16 secured together in any suitable manner and journaling end pulleys 18 through pulley shafts 20 (only one pulley and pulley shaft is shown) mounted in appropriate bearings 21. An endless conveyor belt 22 is trained over the pulleys 18 and suitable power means is connected to the pulley that is not shown for moving the belt 22 in the direction of arrow 24 of Figures 1 and 4.

As shown in Figure 3, the frame for conveyor 10 may include a screw conveyor 26 mounted within a slotted housing 28, the slot 29 of which extends longitudinally of the housing. The housing may be fixed to side members 16 by bolts 27. The housing includes an open end 45 that extends outwardly of conveyor 10 approximately as shown in Figure 3. A scraper 30 is fixed to the housing 28 where shown in Figures 2 and 3 and engages the surface of end pulley 18 to scrape dirt off same so that it will not build up underneath the conveyor belt. The screw 26 includes a shaft portion 32 which is journaled in suitable bearings 34 and 36. A housing 38 surrounds the bearings of the screw shaft 32 and the end pulley 18 and also encloses a chain 40 trained over appropriate sprockets suitably keyed to the shafts 20 and 32. The bearing 36 may be secured to the housing 28.

During operation of the belt 22, the chain 40 turns the screw in the direction of the arrow of Figure 2 to convey any dirt that falls in housing 28 out the open end 45 thereof. This keeps dirt from building up on the surface of pulley 18, which otherwise would have the effect of applying undesirable tension forces to the belt 22.

Our belt guard comprises a longitudinally slotted tubular member 50 mounted in any suitable manner in extension pieces 52 which are welded to the ends of conveyor frame members 16. The housing 50 is formed with a downwardly opening slot 54 (see Figure 2) which extends across the portion of the housing that lies between the members 16. As indicated in Figure 3, preferably the housing 50 includes an outwardly projecting end 56, the extremity of which is open, as at 57.

A screw conveying member 60 is mounted within tubular housing 50 and is keyed to a shaft 62 that is journaled in a suitable bearing 64 fixed to the adjacent extension piece 52. The shaft 62 is also journaled in a suitable bearing 66 carried by a supplemental housing 68 that covers this structure and also chain 70 which is trained over suitable sprockets (not shown) that are keyed to the shafts 20 and 62.

A top wear plate 72 is fixed over the tubular housing 50 and between the extension pieces 52. Secured to the edge of plate 72 that is positioned adjacent the belt 22 is a sealing element 74 that is in substantial wiping engagement with the load supporting surface of the belt. Seal 74 may be secured to plate 72 in any suitable manner as by bolts 76. An end wear plate 78 is fixed between pieces 52, as well as wear plate 80, which is fixed to a second lower plate 82 that is in turn fixed to the conveyor frame members 16. The wear plates 72, 78, 80, and 82 may be secured together or to elements 16 or 52 in any suitable manner, as by welding.

If desired, the conventional side boards 86 may be extended the amount indicated in Figure 2 (between the dotted line 88 and the end 90), and reinforcing plates 92 fixed between these side boards and the wear plates of the protector.

In operation, the belt conveyor moves in the direction of the arrow 24 of Figures 1 and 4 when same is in operation, and when the elevating grader is in motion, the conveyor 10 and the disc 12 move in the direction of arrow 100. The disc 12 is positioned to bite into the ground and deflects a quantity of earth 102 towards the conveyor 10. As the vehicle continues to move ahead, the new material accumulating or deflected by the disc pushes the material ahead of it on to conveyor 22 which elevates it and disposes of it in the usual manner.

Our belt guard or protector serves two principal functions. It protects the belt from the earth and other material that is deflected by the disc 12 on to it, this function being served by the wear plates and seal 74. Also, as the grading elevator moves along, quantities of earth will tend to accumulate between the lower portion of the rounded surface of the conveyor belt that is formed by pulley 18, the wear plates, and the ground. The direction of movement of the belt 22 forces this material into the slot 50 of the tubular housing and screw conveyor 60, turning in the direction of the arrow of Figure 2, moves this material transversely of the conveyor and out the open extremity 57 of end 56 thereof. This insures that earth, gravel and other matter will not become tightly jammed against this curved portion of the conveyor.

It may also be added that our belt protector also protects the belt from the disc. Heretofore, the natural tendency was to fix the disc as close as possible to the belt with the result that the disc would cut the belt upon the breaking of a bolt or the bending of a brace.

With our belt protector applied to a conveyor such as conveyor 10, the grading disc can be set almost in contact with the guard, thus insuring that a maximum of graded material will be forced over the guard on to the conveyor belt. The former practice of digging the end of the belt into the material being loaded is thus eliminated along with the accompanying shortened useful life of the belt.

The foregoing description and the drawings are given merely to explain and illustrate our invention, and the manner in which it may be performed, and the invention is not to be limited thereto, except in so far as the appended claims are so limited since those skilled in the art who have our disclosure before them will be able to make modifications and variations therein without departing from the scope of the invention.

We claim:

1. In an endless conveyor of the type which is loaded by pressing the material being loaded against one end thereof, the improvement wherein a slotted housing is mounted in fixed relation to the conveyor and spaced outwardly of said one end thereof and extends across same, with the slot of said housing extending longitudinally of said housing, and opening from the bottom of said conveyor, and wherein screw conveying means extends longitudinally of said housing.

2. In an elevating grader including an elevating conveyor extending generally transversely thereof on to which material being graded is directed by a grading disc positioned adjacent the material receiving end thereof, the improvement wherein a slotted housing is mounted in fixed relation to the conveyor and spaced outwardly of said one end thereof and extends across same, with the slot of said housing extending longitudinally of said housing and opening from the bottom of said conveyor, wherein screw conveying means extends longitudinally of said housing, and wherein wear plate means covers said housing and protects said end of said conveyor.

3. In an endless conveyor including an endless member trained over pulleys rotatably mounted in a frame extending longitudinally of the conveyor, the improvement wherein a slotted housing is fixed to the frame adjacent but spaced outwardly of the material receiving end of the conveyor, with the slot of said housing extending longitudinally of said housing and opening from the bottom thereof, and wherein screw conveying means extend longitudinally of said housing.

4. In an elevating grader including an elevating conveyor in the form of an endless belt trained over pulleys rotatably mounted in a frame extending longitudinally of the conveyor, with the material being graded off being directed onto the material receiving end of the belt by a grading disc positioned adjacent the material receiving end thereof, the improvement wherein wear plate means substantially covers said end of the belt, wherein a slotted housing is mounted in fixed relation to the conveyor under said wear plate means and spaced between said material receiving end thereof and the disc, said housing extending transversely of the conveyor with the slot of said housing extending longitudinally of said housing and opening from the bottom of said conveyor, and wherein screw conveying means extends longitudinally of said housing, whereby material jamming between the ground and the rounded portion of the material receiving end of the belt is conveyed laterally of the belt and out from under same.

5. In an elevating grader including an elevating conveyor in the form of an endless conveyor belt trained over pulleys rotatably mounted in a frame extending longitudinally of the conveyor, with the material being graded off being directed onto the material receiving end of the belt by a grading disc positioned adjacent the material receiving end thereof, the improvement wherein a slotted housing is fixed to said frame at the material receiving end of the conveyor between the curved end of the belt defined by the material receiving end pulley thereof and the disc, said housing extending transversely of the conveyor with the slot of said housing extending longitudinally of said housing and opening from the bottom of said conveyor, and wherein screw conveying means extends longitudinally of said housing, whereby material jamming between the ground and the rounded portion of the material receiving end thereof is conveyed laterally of the belt and out from under same.

6. The improvement set forth in claim 5 wherein drive transmitting means interconnects said screw conveying means with said material receiving end pulley.

7. The improvement set forth in claim 5 wherein said housing is covered by substantially imperforate wear plate means on all sides except the side thereof adjacent said curved end of said belt, said imperforate means forming a receptacle for material jamming between the ground and the belt.

References Cited in the file of this patent

UNITED STATES PATENTS

| | | |
|---|---|---|
| 1,477,776 | Shedenhelm | Dec. 18, 1923 |
| 1,779,686 | Alver | Oct. 28, 1930 |
| 1,953,979 | Speno | Apr. 10, 1934 |
| 2,109,123 | White | Feb. 22, 1938 |